(No Model.)
E. C. ATWOOD.
DUST PAN.
No. 317,433. Patented May 5, 1885.
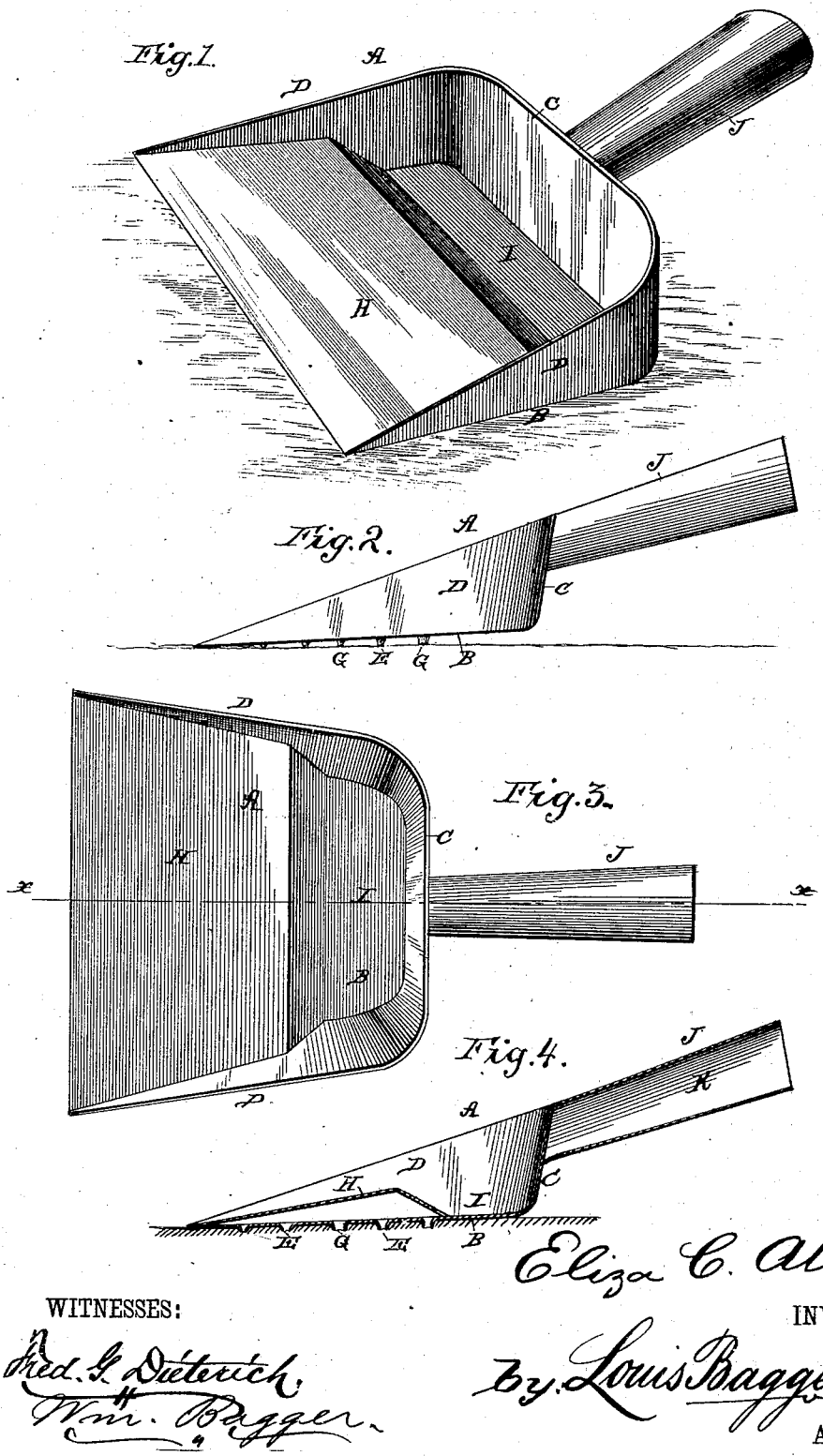
WITNESSES:
INVENTOR.
Eliza C. Atwood,
By Louis Bagger & Co.,
ATTORNEYS.

UNITED STATES PATENT OFFICE.

ELIZA CHESTER ATWOOD, OF GENEVA, NEW YORK.

DUST-PAN.

SPECIFICATION forming part of Letters Patent No. 317,433, dated May 5, 1885.

Application filed December 22, 1884. (No model.)

*To all whom it may concern:*

Be it known that I, ELIZA CHESTER ATWOOD, a citizen of the United States, and a resident of Geneva, in the county of Ontario and State of New York, have invented certain new and useful Improvements in Dust-Pans; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved combined dust-pan and gatherer. Fig. 2 is a side view of the same. Fig. 3 is a top or plan view of the same; and Fig. 4 is a longitudinal vertical sectional view taken on the line $x \, x$ in Fig. 3.

The same letters refer to the same parts in all the figures.

This invention relates to devices for gathering dust and the like from floors and carpets, and which are generally known as dust-pans; and the invention consists in certain improvements in the construction of the same, which will be hereinafter fully described, and particularly pointed out in the claims.

In the drawings hereto annexed, A designates a pan of suitable shape, consisting of a flat base, B, having a rear flange, C, and provided with inclined side flanges, D D, extending from its rear to its front end or edge. The bottom or base, B, is provided with a series of perforations, E E, struck down from itself, so as to form downwardly-projecting sharp-pointed tongues, G G, the purpose of which will be hereinafter fully described.

Secured to the front edge of the plate B is a top-plate, H, which is arranged in an inclined position, its side edges being soldered or otherwise secured to the side flanges, D D, thus forming a cover over the holes in the bottom B. The rear edge of the said top plate is bent downward and secured to the base-plate B, thus forming at the rear end of the latter a recess or receptacle, I.

The rear end of the pan or device is provided with a handle, J, constructed with a socket, K, into which a broom-handle or other suitable stick or handle may, when desired, be inserted.

From the foregoing description taken in connection with the drawings hereto annexed, the operation and advantages of this invention will be readily understood. It is simple in construction, convenient, and may be readily used after the manner of an ordinary dust-pan. When it is placed upon a floor or carpet, the points or tongues G G, which extend from near the front edge of the pan back as far as the "false bottom" H goes, and can be made of different sizes, the smaller holes, or those having the shorter projections, being placed near the front edge, so that they will not cause the front of the pan to be raised from the floor, but of sufficient length to keep the pan from slipping backward as the broom or brush enters it; and as the broom passes up the inclined bottom H, and the backward tendency of the pan is greater, the greater downward pressure of the broom is also greater, which causes the longer teeth of the larger holes that are farther from the front to engage with the floor and keep the pan in position while in use, and the recess or receptacle I at the rear end will serve to retain the dust after being swept into the pan, thereby avoiding the common disadvantage of the dust being spilled after being once swept up, thereby making it necessary to do the work over again.

I am aware that it is not new to provide dust-pans with downwardly-pointed projections to prevent the backward movement of the pan when in use, and I do not claim such construction, broadly; but

I claim and desire to secure by Letters Patent—

1. A dust-pan having a "struck-up" bottom forming burrs upon its under side, and a covering for said struck-up portion, substantially as and for the purpose set forth.

2. A dust-pan having a struck-up bottom forming burrs upon its under side of different lengths, the shorter burrs being arranged near the front edge of the pan, and the longer burrs farther back, and a covering for said struck-up portion, substantially as and for the purpose set forth.

3. A dust-pan having a struck-up bottom forming burrs upon its under side of different lengths, the shorter burrs being arranged near the front edge of the pan and the longer ones farther back, and an inclined cover for said struck-up portion having a downwardly-projecting rear edge, and being secured to the pan, substantially as shown, and for the purpose set forth.

In testimony that I claim the foregoing as my own I have hereunto affixed my signature in presence of two witnesses.

ELIZA CHESTER ATWOOD.

Witnesses:
GEO. G. ATWOOD,
BERTHA C. ATWOOD.